United States Patent
Winton et al.

(10) Patent No.: US 9,750,094 B1
(45) Date of Patent: Aug. 29, 2017

(54) ENERGY SAVING UNDER-CABINET LIGHTING SYSTEM USING LIGHT EMITTING DIODES WITH A USB PORT

(71) Applicants: Jeffrey Winton, Chicago, IL (US); Sri Sridharan, Hickory Hills, IL (US)

(72) Inventors: Jeffrey Winton, Chicago, IL (US); Sri Sridharan, Hickory Hills, IL (US)

(73) Assignee: Radionic Industries, Inc., Chicago, IL (US)

(*) Notice: Subject to any disclaimer, the term of this patent is extended or adjusted under 35 U.S.C. 154(b) by 0 days.

(21) Appl. No.: 15/187,041

(22) Filed: Jun. 20, 2016

Related U.S. Application Data (63) Continuation-in-part of application No. 12/284,559, filed on Sep. 23, 2008, now Pat. No. 9,374,856.

(51) Int. Cl.
H05B 33/08 (2006.01)
H05B 37/02 (2006.01)

(52) U.S. Cl.
CPC ..... *H05B 33/0815* (2013.01); *H05B 33/0845* (2013.01)

(58) Field of Classification Search
CPC ......... F21Y 2103/003; F21Y 2113/005; H05B 37/02; H05B 33/0824; H05B 33/0809; H05B 33/0863
USPC .............................. 315/291, 185 R, 224, 307
See application file for complete search history.

(56) References Cited

U.S. PATENT DOCUMENTS

| | | | |
|---|---|---|---|
| 6,088,211 A * | 7/2000 | Pitel | H01T 23/00 361/212 |
| 6,283,612 B1 | 9/2001 | Hunter | |
| 7,296,912 B2 | 11/2007 | Beauchamp | |
| 2006/0022214 A1* | 2/2006 | Morgan | F21K 9/00 257/99 |
| 2007/0052376 A1* | 3/2007 | Lee | H05B 33/0866 315/312 |
| 2007/0228999 A1 | 10/2007 | Kit | 315/291 |
| 2007/0242441 A1 | 10/2007 | Aldrich et al. | |
| 2007/0247851 A1 | 10/2007 | Villard et al. | |
| 2007/0290621 A1 | 12/2007 | Clark et al. | |
| 2008/0055900 A1 | 3/2008 | Budike et al. | |
| 2008/0062689 A1 | 3/2008 | Villard | |
| 2008/0062691 A1 | 3/2008 | Villard et al. | |
| 2008/0080190 A1 | 4/2008 | Walczak et al. | |
| 2008/0089069 A1 | 4/2008 | Medendorp | |
| 2008/0096429 A1* | 4/2008 | Mikolajczak | H01R 13/68 439/620.08 |
| 2011/0287665 A1* | 11/2011 | Chien | F21S 8/035 439/638 |

* cited by examiner

*Primary Examiner* — Douglas W Owens
*Assistant Examiner* — Amy Yang
(74) *Attorney, Agent, or Firm* — Clifford H. Kraft (57) ABSTRACT

An energy efficient under-cabinet lighting system with a low profile switch mode power supply complying with Class 2 requirements. This power source is enclosed in a container to provide constant current to an array of light emitting diodes LEDs that are characterized by long life and low power usage. The system is designed to replace existing under-cabinet fluorescent lamp fixtures. A diffuser minimizes pixelization. The unit is also equipped with a safe-charge USB port that can safely charge lithium-ion batteries of accessories like tablets and cellphones with no danger of overheating their batteries.

17 Claims, 9 Drawing Sheets

USB POWER SUPPLY

ENERGY SAVING UNDER-CABINET LIGHTING SYSTEM USING LIGHT EMITTING DIODES WITH A USB PORT

This is a continuation-in-part of application Ser. No. 12/284,559 filed Sep. 23, 2008. Application Ser. No. 12/284,559 is hereby incorporated by reference in its entirety.

BACKGROUND

Field of the Invention

The present invention relates generally to lighting and more particularly to an energy savings under-cabinet lighting system having a USB port and using Light Emitting Diodes (LED's).

Description of the Problem

There is a need for saving more energy in these under-cabinet luminaries using specifically designed integral power supply with low power consumption to provide power to the Energy Saving LED's. This invention is an energy saving under-cabinet lighting system.

A light emitting diode (LED) is a semiconductor device that creates light using solid-state electronics A diode is composed of a layer of electron nch material separated by a layer of electron deficient material which forms a junction Power applied to this junction excites the electrons in the electron rich material leading to photon emission and the creation of light. Depending on the chemical composition of the semiconductor layers, the color of light emission will vary within the visible range of electromagnetic spectrum.

LED's are much more energy efficient than their incandescent and fluorescent lamps LED's are very energy efficient producing up to 90 percent light output with very little heat dissipation. Also, LED lighting technology includes features such as less energy consumption, long service life, high quality light, and suitability for cold temperature operation In addition, LED's do not contain mercury and are environment friendly In addition, there is a great need to place a USB port on the surface of lighting fixtures to charge accessories such as laptops, tables and cellular telephones. However, charging lithium-ion batteries has fire hazard problems in that, if they receive too much charging current, they overheat. It would be very advantageous to have a lighting system with a USB port that can safely charge accessories without the danger of overheating.

Generally there are 2 types of power supplies, magnetic and electronic switch mode In this lighting system, the switch mode electronic power supply is used for energy efficiency, low profile, and light weight, to provide power to LED's.

SUMMARY OF THE INVENTION

The present invention relates to an energy saving under-cabinet luminaries using an energy efficient switch mode power supply optimized to provide maximum power to the LEDs while remaining within UL class 2 requirements of the Power Supply. These luminaries have a safe USB charging port that can safely charge lithium-ion batteries of accessories.

The present invention provides an energy saving under-cabinet Luminaire consisting of an enclosure, Class 2 integral power supply to provide power LEDs arranged in a special pattern to effectively replace 8 W, 13 W and 15 W fluorescent lamps or equivalent halogen lamps resulting in 50% of energy savings. Every component is individually optimized to save energy. The simplicity of the power supply using very few components greatly improves the reliability of this lighting system. The power supply is isolated and coupled to the LEDs so that it has a power factor of at least 90%.

A specially angled diffuser to converge the light output from the lighting system of the working area of the under-cabinet. The lenses of the LEDs are so chosen that the inner array near the wall has 30 degrees spread, and the outer array away from the wall has 60 degree spread to achieve more light in the working area of the under-cabinet.

DESCRIPTION OF THE FIGURES

Attention is directed to several figures that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

Figure 1:
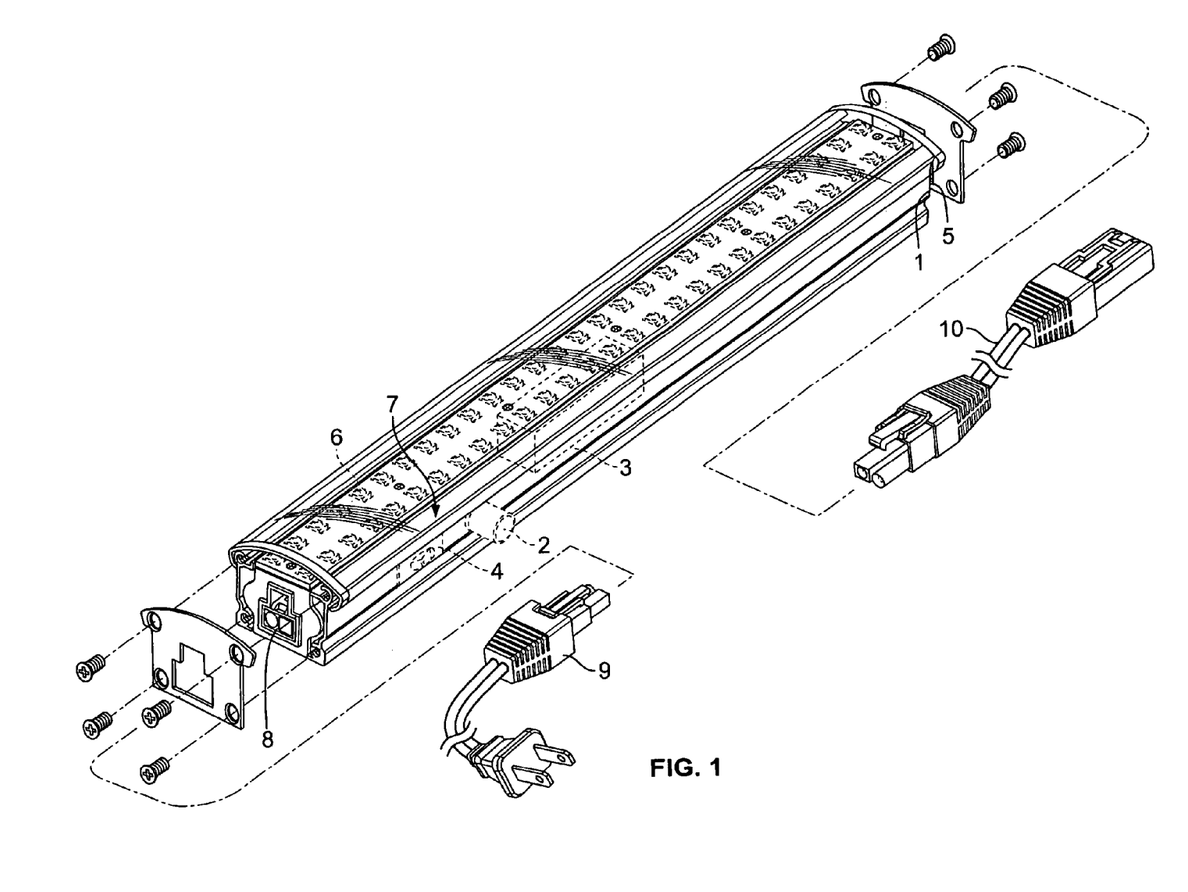
FIG. 1 shows the full exploded view of the entire LED under-cabinet unit lamp unit with all components marked.

In the preferred embodiment, as illustrated in FIG. 1, the main components are the input power connector 8, coupled to an external power cord 9, an enclosed SMPS power supply 3, providing the necessary voltage and content current to the LED's 6, a simple resistive dimmer potentiometer switch 2, to reduce the current to the LED's to create dimming effect, a main on/off switch 4, and an output connector 5 to link the unit with an external interconnect cord 10 to another unit.

Figure 2A:
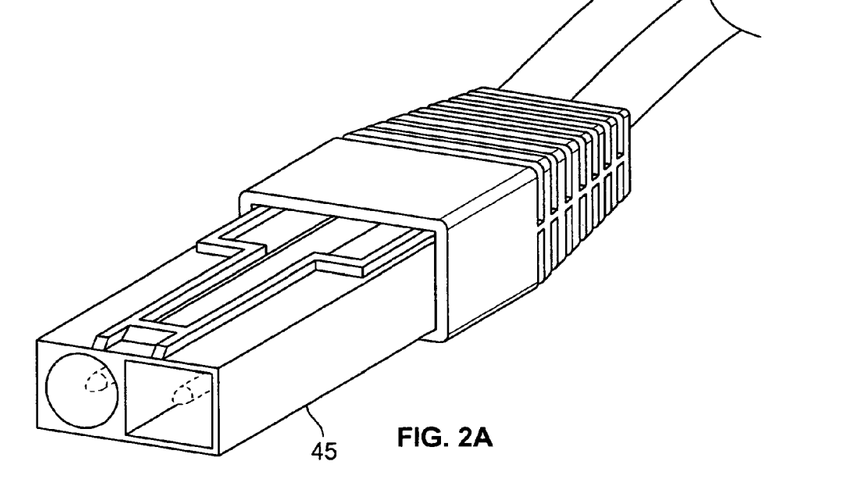
FIG. 2A shows the front view of a first type of quick input connector for easy electrical connections.
Figure 2B:
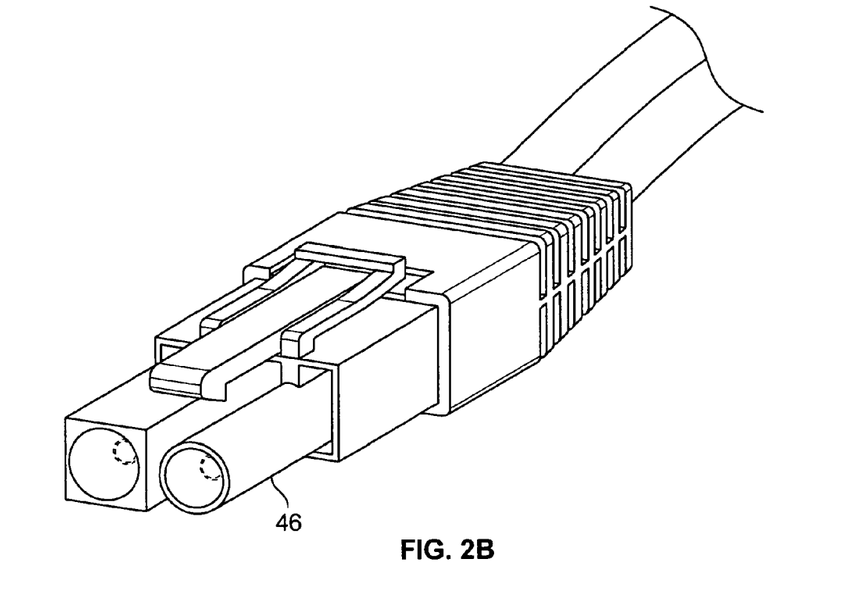
FIG. 2B shows the front view of a second type of quick output connector for easy electrical connections.

The unit can be used with quick connectors for electrical safety. FIG. 2A shows the front view of a first type of quick input connector for easy electrical connections, while FIG. 2B shows the front view of a second type of quick output connector. The connector in FIG. 2A has a round/square configuration, while the connector in FIG. 2B has a round/round configuration.

Figure 3A:
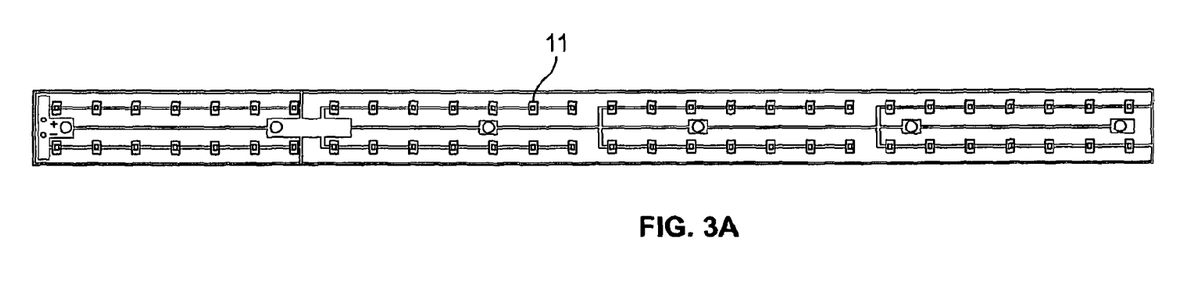
FIG. 3A shows the front view array of layout of the LED's on a printed wiring board for 56 LED boards.
Figure 3B:
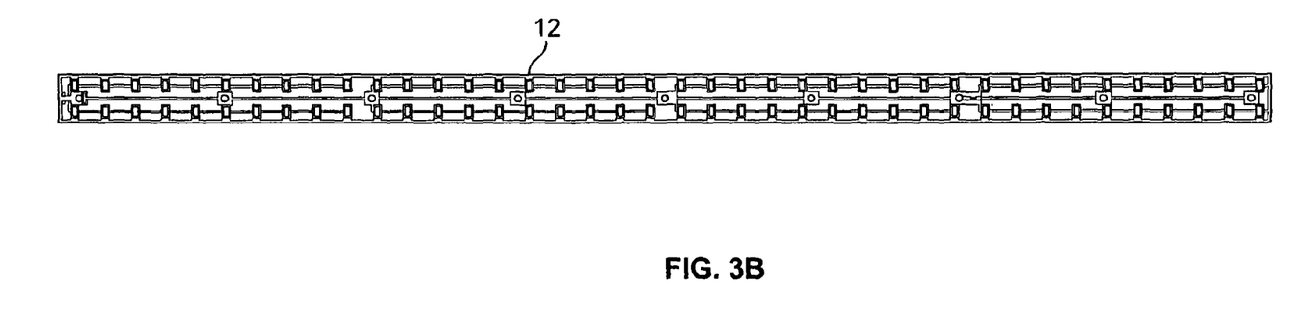
FIG. 3B shows the front view array of layout of the LED's on a printed wiring board for 80 LED boards.
Figure 4:
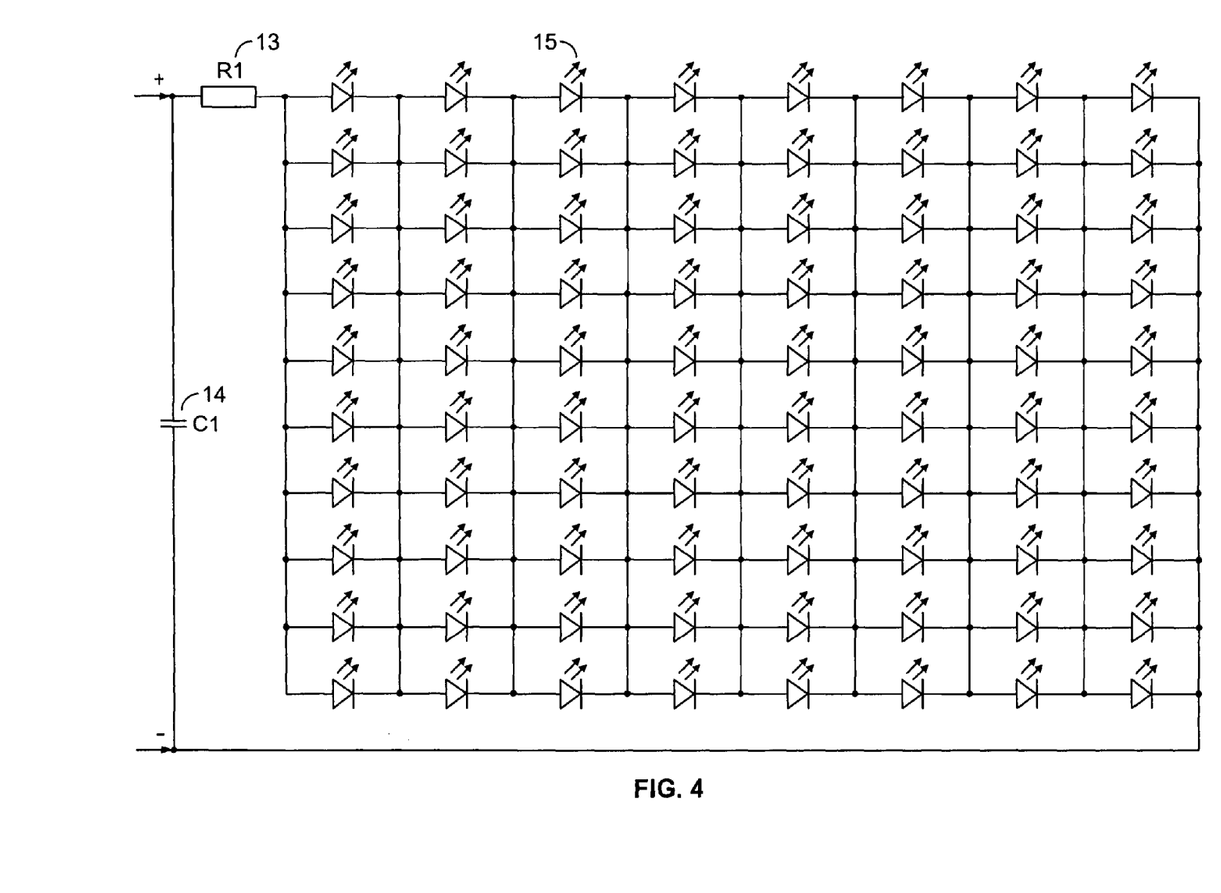
FIG. 4 shows the wiring of 80 LED's in series parallel circuit.
Figure 5:
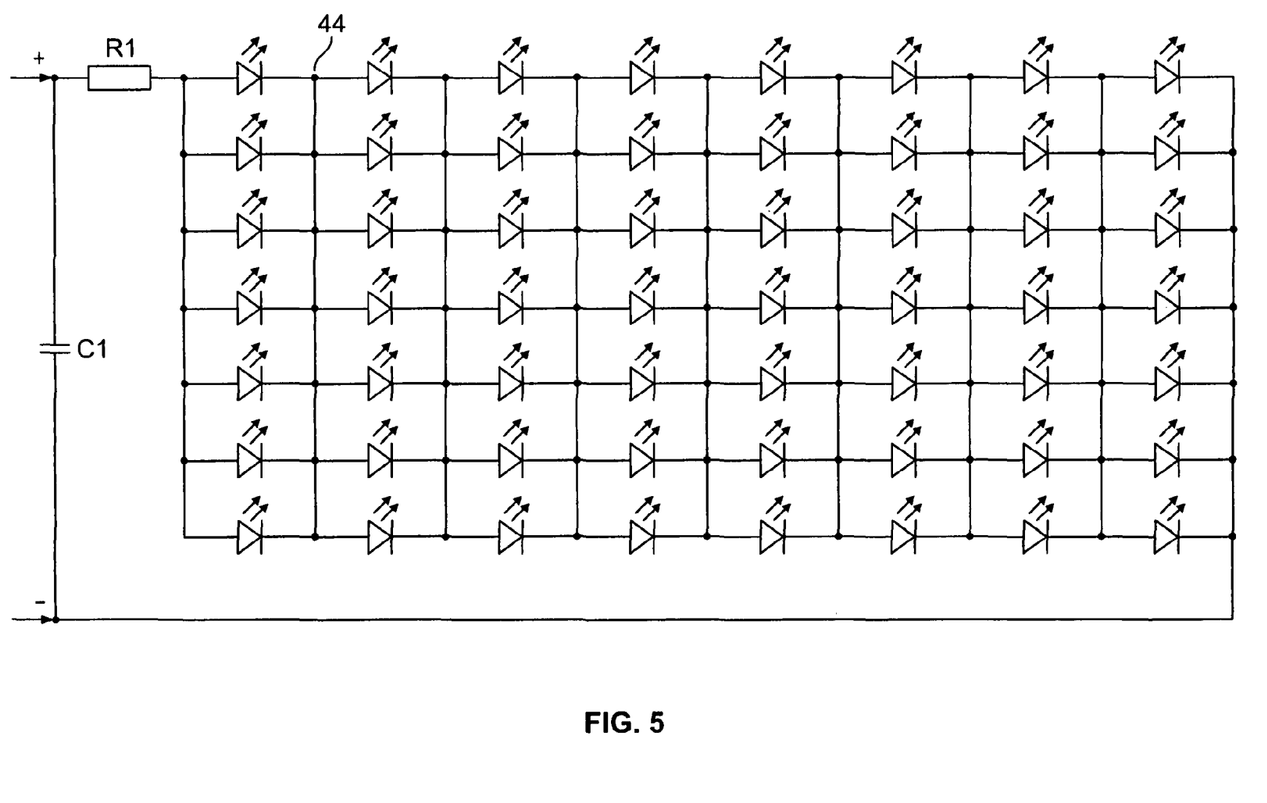
FIG. 5 shows the wiring of 56 LED's in series parallel circuit.

Two LED configurations can be used, the first with 56 LEDs and the second with 80 LED's. The 56 LEDs put out enough light output to replace an under-cabinet light fixture using one F8T5 (8 W) fluorescent lamp or equivalent lamp. This is shown in FIG. 3A. The 80 LEDs put out enough light output to replace and under-cabinet fixture using one F15T8 (15 W) or F13T5 (13 W) fluorescent lamp as shown in FIG. 3B. The numbers 56 and 80 are chosen to be cost effective. These numbers can change depending on growth of LED technology resulting in cost reduction by using fewer LED's with higher lumens per watt. FIG. 4 shows a schematic of the 80 LED circuit, while FIG. 5 shows a schematic of the 56 LED circuit. In each case, there is a current-limiting resistor 13 in series with the array and a capacitor 14 in parallel with it.

Figure 6:
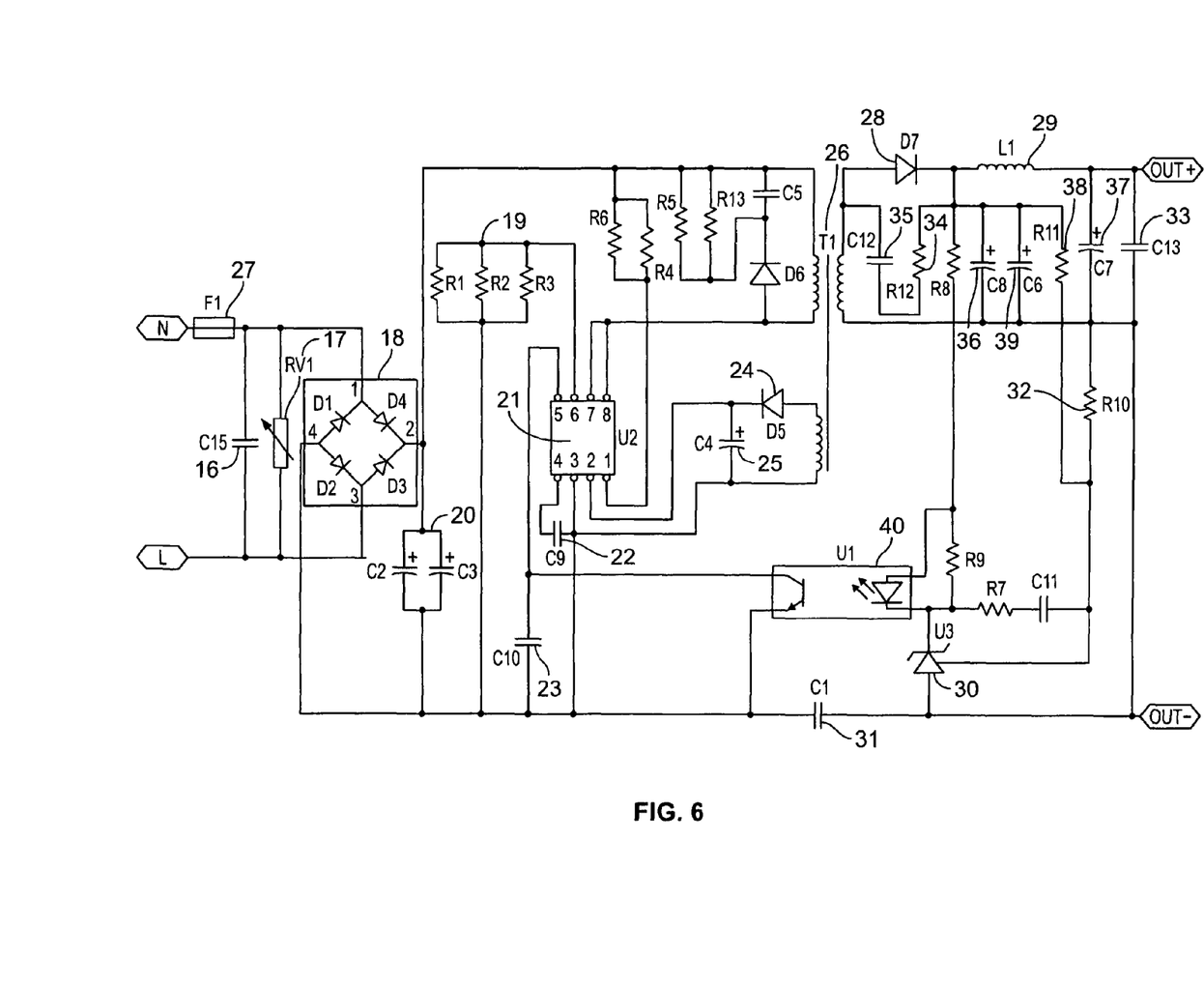
FIG. 6 shows the schematic diagram of the circuit of the LED Power Supply with components marked.

The design of the power supply is so chosen to put out 30 VDC maximum and still come under Class 2 requirements of Underwriters Lab (UL Inc.) Standard 1310 by limiting the voltage and current for safety considerations without compromising the optimum performance. An embodiment of such a class 2 power supply is schematically illustrated in FIG. 6.

The first stage of power supply has an input stage filter network consisting of a metal oxide varistor 17, rated at 150V for surge suppression, a safety current limiting fuse 27 rated ½ A 250 VAC, and an across-the-line capacitor 6, rated 22 pF at 250V to absorb the transients.

The second stage is a full wave bridge rectifier consisting of a bridge rectifier 18, with four diodes, rated 1 Amp. 400V with a filter capacitor 20, rated 4.7 uF, 400V.

The third stage is a is a feeder network coupling the rectified AC voltage to an integrated control chip 21 which determines the pulse width after converting the rectified voltage to a high frequency chopped voltage.

The processed signal is fed to the transformer 26 with a ferrite core having the following construction:
Primary Windings:
Wind 18T on the magnet core EFDI5 FROM Pin I to Pin 3 by 0.15 enamel.
Secondary Windings:
Wind 135T on the magnet core EFDI5 FROM Pin 2 to Pin 4 by 0.2 mm enamel.
Wind 32T on the magnet core EFDI5 FROM Pin 8 to Pin 5 by 0.2 mm×3 enamel.

An auxiliary secondary has 7 turns of 0.15 mm enameled copper wire. This winding is also used in the feed back circuit to regulate the output voltage and current.

The transformer 26 steps down the input high voltage pulses to low voltage pulses. The diode 28, rated 1 Amp. 400V is a rectifier which is coupled to a resistor 32 rated 5.1 ohms through inductor 29.

An output filter network consists of a resistor 34 rated 10 Ohms coupled to a capacitor 35 rated 680 pF 150V in series coupled to parallel capacitors 36 and 39 rated 220 uF 50V to smooth out the ripple in the output waveform. Output filter choke 29 is coupled between capacitor 37 and diode 28. This choke stores magnetic energy to provide a constant output current and voltage to LED's.

Resistor 38 rated 44 k ohms ½ w, is connected to choke 29. Choke 29 and a parallel capacitor 33 rated 470 uF 30V form the output filter network.

An adjustable reference zener diode 30 is provided to regulate output voltage and current. This zener is coupled to the power supply through resistors 32 and 38, rated 5.1 k Ohms and 44 k ohms respectively.

The turn on reference voltage is determined by resistors 32 and 38. When the output exceeds the set voltage, the zener diode 30 provides a turn on signal to opto-isolator 40, model PC8 17 which is coupled to capacitor 23 rated 22 pF 50V which is further coupled to pin 5 of 21 to regulate the output. Capacitor 22 rated 68 pF 50V provides the timing frequency for oscillations.

Diode 24 rated 1 Amp. 700V is coupled to the transformer auxiliary winding of transformer 26 and capacitor 25 rated 47 uF 16 V. This network provides start up current for the transformer oscillations. Capacitor 37 rated 100 uF 50 V provides necessary filtering of the output voltage by reducing the output ripple.

The LED's are laid out in a Flame retardant Printed Wiring Board (PWB) as shown in FIGS. 3A and 3B and convert the electric power input into visible white light to illuminate the under-cabinet area. The output coupling connector 10 shown in FIG. 1 may be used to couple another unit as needed.

Figure 7:
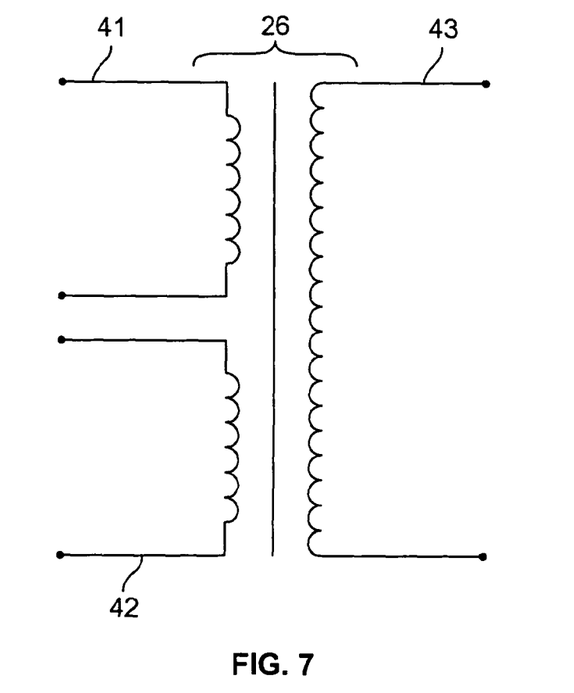
FIG. 7 shows the construction details of the output transformer of the LED Power Supply.

FIG. 7 is an illustration of output transformer segments, primary 41, auxiliary winding 42 and secondary 43.

Figure 8:
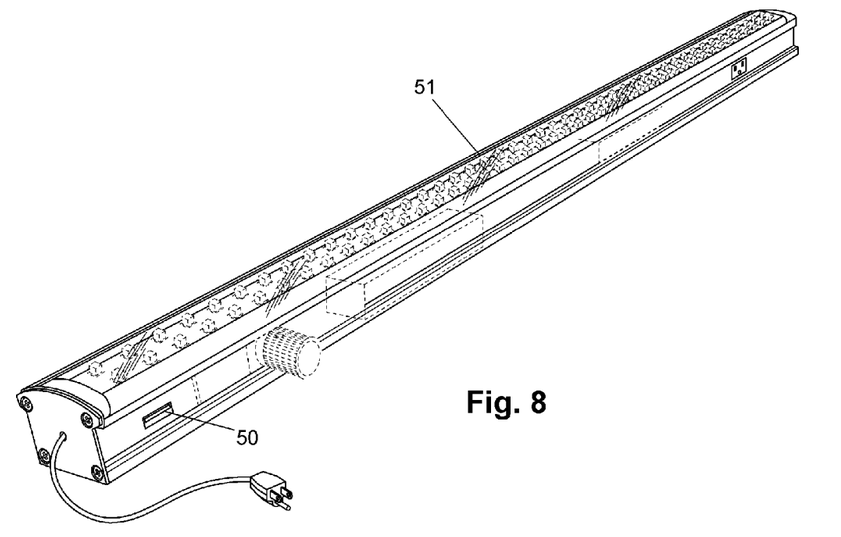
FIG. 8 shows a view of the LED under-cabinet unit lamp unit with a USB port.

FIG. 8 shows a view of a fixture with a USB port 50. The USB port is conveniently located for safe charging of accessories. The present invention can also be equipped with a polycarbonate plastic diffuser 51 shown in FIG. 8 that is about 2 mm thick of the type of translucent plastic called LEXAN™ made by General Electric and others. This diffuser is used for dispersion of dots pixualization from the LED in order to obtain uniform lighting. This reduces the Dot Matrix LED lighting. The optimum distance from the LEDs to the diffuser has been found to be 17 mm which makes the light more uniform and greatly reduces the pixualization further reducing the Dot Matrix LED lighting.

Figure 9:
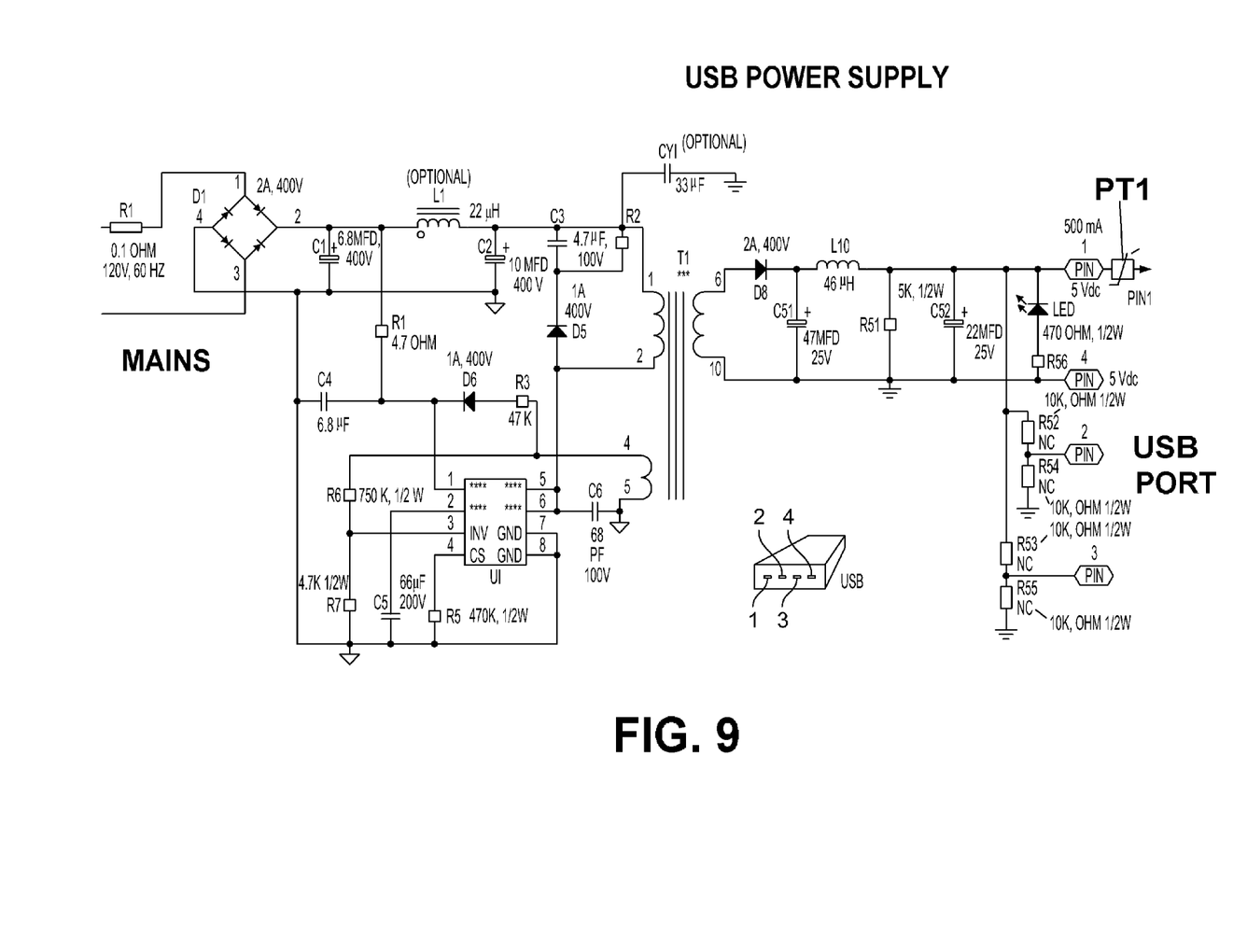
FIG. 9 is a schematic diagram of a power supply for the USB port with a safe charging feature.

FIG. 9 shows a schematic diagram of an embodiment for a USB port power supply: The 120V, 60 Hz power from the mains has input fusible resistors R1 rated 1 ohm, 1 watt. It is then rectified by a bridge rectifier Dl. The rectified signal is filtered by a capacitor C2 rated 6.8 uF 400V. The filter network is π (PI) filter formed by C1, R1 and C4 and further filtered by choke L1 and capacitor C2. These filters also help to reduce Electro Magnetic Radiation (EMI) back to the input mains by conduction process. The filtered output is coupled to a ferrite core high frequency transformer T1. The transformer is further coupled to Control IC chip U1. This controls the pulse width and frequency of rectified waves of the Primary of transformer T1.

There is a feed winding (pins 4 and 5) set up through a potential divider circuit formed by resistors R6 and R7 that is coupled to chip U1. This controls the output voltage constant 5 VDC by controlling the pulse width. The secondary of the transformer (pins 6 and 10) is stepped down low voltage pulses and further smoothly rectified by a diode D8 rated 2 Amp 50 V. This signal is then fed to a capacitor C51 further smoothes the ripple and coupled to capacitor C52 through a series filter inductor choke L10. Across the output terminals pin 1 and pin 4 an indicator LED is connected in parallel with a series current limiting resistor R56 rated 470 Ohms ½ W. The output voltage is a regulated 5 VDC.

The 5 VDC output is connected to pins 1 and 4 of the USB connector (outer pins). The output pin 1 is connected to a series positive temperature coefficient (PTC) thermistor to regulate and limit the charging current to a safe value of approximately 400 mA. Excessive charging current will result in overheating the lithium-ion batteries resulting in a fire hazard. The lithium-ion batteries have a very high charge density. So, charging current should be limited to safe value between 300-400 mA for typical charging a laptop or a cellphone. The PTC thermistor PT1 typically offers less than 1 ohm under operating normal current and the Resistor value increases to very high value to limit the charging current The thermistor PT1 is operated under self heating mode. In this mode, it is in series connected with the battery load. It heats up as the current increases until it reaches a critical temperature Tc; then the resistance increases by large amount thereby reducing the current. So it acts as safe cut off regulator reducing the hazard created by excessive charging current to the battery.

The Thermistor PT1 is so chosen in such a way that the typical resistance is approximately 0.3 ohm at 25 degrees C. at non-trip current (Int), and the value increases to 1-2 k Ohms or more at around 450 mA at trip current (It). This feature of the present invention positively prevents the batteries in the charging accessory from overheating by providing over-current protection.

The 5 VDC output is voltage is further divided to approximately to 2.5 VDC by potential dividers formed by resistors R52 and R54, rated 10 k Ohms ½ w which couples to pin 2 of the USB Port. Resistors R53 rated 10 k Ohm ½ W and R55 rated 10 k Ohm ½ W form another potential divider that couples to pin 3 of the USB port. In this embodiment of the power supply, the pins do not transfer any data since no data is stored or delivered by the under-cabinet luminaire.

The power supply from the mains 120 VAC 60 Hz, can also be connected to the convenient outlet.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. An under-cabinet luminaire adapted to be mounted near a wall comprising:
    a housing adapted to fit under a cabinet with a power connector mounted on said housing;
    said housing containing a printed wiring board holding an array of LEDs and a switch-mode power supply configured to supply DC power to said printed wiring board and said array of LEDs;
    said printed wiring board containing a power control circuit with a dimmer circuit for controlling said array of LEDs, said power control circuit configured to supply a predetermined constant current to said array of LEDs as controlled by said dimmer circuit
    a translucent light diffuser mounted on said housing adapted to provide focused light from said array of LEDs over a working area under a cabinet;
    said housing having an attached Universal Serial Bus (USB) port adapted to charge batteries in accessories and a regulated USB power supply, said USB power supply having over-current protection allowing safe charging of lithium-ion batteries in said accessories;
    wherein said switch mode power supply includes a ferrite transformer with the following windings:
    a first winding of 18 turns on a ferrite core;
    a second winding of 135 turns on said ferrite core;
    a third winding of 32 turns of 3 wires on said ferrite core.

2. The under-cabinet luminaire of claim 1 wherein said over-current protection is a PTC thermistor.

3. The under-cabinet luminaire of claim 2 wherein said PTC thermistor limits charging current to less than 450 mA.

4. The under-cabinet luminaire of claim 1 wherein said translucent light diffuser is a polycarbonate plastic approximately 2 mm thick mounted approximately 17 mm from said array of LEDs.

5. The under-cabinet luminaire of claim 1 wherein said dimmer circuit contains a potentiometer.

6. The under-cabinet luminaire of claim 1 wherein lenses of LEDs in said array of LEDs are configured so that an inner row of said array near the wall has a 30 degree light spread and an outer row of said array away from the wall has a 60 degree light spread.

7. The under-cabinet luminaire of claim 1 further comprising an input filter stage including a metal oxide varistor rated to 150 volts and a safety fuse rated at ½ Ampere.

8. The under-cabinet luminaire of claim 1 wherein said array of LED's contains at least 56 LEDs arranged into 7 electrically parallel rows, each row having 8 LEDs in series to replace a F13T5 fluorescent tube.

9. The under-cabinet luminaire of claim 1 wherein said array of LED's contains at least 80 LEDs arranged into 8 electrically parallel rows, each row having 10 LEDs in series to replace a F15T8 fluorescent tube.

10. An under-cabinet luminaire adapted to be mounted near a wall comprising:
    a housing adapted to fit under a cabinet with a power connector mounted on said housing;
    said housing containing a printed wiring board holding an array of LEDs and a switch-mode power supply having a power factor of greater than 90% configured to supply DC power to said printed wiring board and said array of LEDs;
    said printed wiring board containing a power control circuit with a dimmer circuit for controlling said array of LEDs, said power control circuit configured to supply a predetermined constant current to said array of LEDs as controlled by said dimmer circuit
    a translucent light diffuser mounted on said housing adapted to provide focused light from said array of LEDs over a working area under a cabinet;
    said housing having an attached Universal Serial Bus (USB) port adapted to charge batteries in accessories and a regulated USB power supply, said USB power supply having over-current protection allowing safe charging of lithium-ion batteries in said accessories;
    wherein said switch mode power supply includes a ferrite transformer with the following windings:
    a first winding of 18 turns on a ferrite core;
    a second winding of 135 turns on said ferrite core;
    a third winding of 32 turns of 3 wires on said ferrite core.

11. The under-cabinet luminaire of claim 10 wherein said over-current protection is a PTC thermistor.

12. The under-cabinet luminaire of claim 11 wherein said PTC thermistor limits charging current to less than 450 mA.

13. The under-cabinet luminaire of claim 10 wherein lenses of LEDs in said array of LEDs are configured so that an inner row of said array near the wall has a 30 degree light spread and an outer row of said array away from the wall has a 60 degree light spread.

14. The under-cabinet luminaire of claim 10 wherein said translucent light diffuser is a polycarbonate plastic approximately 2 mm thick mounted approximately 17 mm from said array of LEDs.

15. An under-cabinet luminaire comprising an array of LEDs, a power supply adapted to power the LEDs, a light diffuser mounted over said LEDs and
    a Universal Serial Bus (USB) port adapted to charge batteries in accessories and a regulated USB power supply, said USB power supply having over-current protection allowing safe charging of lithium-ion batteries in said accessories;
    wherein said power supply includes a ferrite transformer with the following windings:
    a first winding of 18 turns on a ferrite core;
    a second winding of 135 turns on said ferrite core;

a third winding of 32 turns of 3 wires on said ferrite core.

16. The under-cabinet luminaire of claim 15 wherein said over-current protection is a PTC thermistor adapted to limit charging current to less than 450 mA.

17. The under-cabinet luminaire of claim 15 wherein said light diffuser is a polycarbonate plastic approximately 2 mm thick mounted approximately 17 mm from said array of LEDs.

* * * * *